(12) United States Patent
Seko

(10) Patent No.: US 10,005,386 B1
(45) Date of Patent: Jun. 26, 2018

(54) MOTORCYCLE TAILLIGHT WITH INTERMITTENT FLASHING SYSTEM AND METHOD THEREOF

(71) Applicant: Honda Motor Co., Ltd., Tokyo (JP)

(72) Inventor: Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 15/677,208

(22) Filed: Aug. 15, 2017

(51) Int. Cl.
  *B60Q 1/26* (2006.01)
  *B60Q 1/34* (2006.01)
  *B60Q 1/30* (2006.01)
  *B60Q 1/44* (2006.01)

(52) U.S. Cl.
  CPC ............... *B60Q 1/343* (2013.01); *B60Q 1/30* (2013.01); *B60Q 1/441* (2013.01)

(58) Field of Classification Search
  CPC .......... B60Q 1/343; B60Q 1/30; B60Q 1/441; B60Q 1/26; B60Q 1/00; B60Q 1/2607; B60Q 1/2615; B60Q 1/2619; B60Q 1/44; B60Q 1/444; B60Q 1/448; B60Q 1/46; B60Q 1/50; B60Q 1/302; F21S 48/20; B60T 7/00; B60T 7/02; B60T 15/04; B60T 15/16; B60T 2201/00; B60T 2201/03; B62J 6/04; B62K 11/00
  See application file for complete search history.

(56) References Cited

U.S. PATENT DOCUMENTS

| | | | | |
|---|---|---|---|---|
| 3,414,879 A | * | 12/1968 | Holland | B60Q 1/441 200/61.89 |
| 3,693,151 A | | 9/1972 | Hasegawa et al. | |
| 3,925,759 A | * | 12/1975 | Lucas | B60Q 1/46 340/471 |
| 4,086,824 A | * | 5/1978 | Johnson | B60T 7/02 188/106 R |
| 4,550,305 A | * | 10/1985 | Bookbinder | B62J 6/001 340/432 |
| 5,345,218 A | * | 9/1994 | Woods | B60Q 1/302 340/464 |
| 5,404,130 A | | 4/1995 | Lee et al. | |
| 5,532,674 A | * | 7/1996 | Michaud | B62J 6/04 340/463 |
| 5,610,578 A | | 3/1997 | Gilmore | |
| 5,798,691 A | * | 8/1998 | Tim Kao | B60Q 1/442 200/61.58 R |

(Continued)

*Primary Examiner* — Zhen Y Wu
(74) *Attorney, Agent, or Firm* — Honda Patents & Technologies North America, LLC; Aaron C. Fong

(57) ABSTRACT

The systems and methods disclosed herein are directed to an intermittent flashing taillight on a motorcycle that may be activated when a foot lever is actuated and a hand lever is actuated between on and off. The flashing sequences, which may be controlled by the driver, through directly actuating the hand lever between on and off, may be more easily discernable than a solid illuminated taillight found in current motorcycles. In an illustrative embodiment, the motorcycle may include a hand lever that is associated with a front brake and a foot lever that is associated with a rear brake. At least one taillight may be provided in the motorcycle. A controller on the motorcycle may intermittently flash the at least one taillight according to actuations of the hand lever between on and off and when the second lever is continuously actuated.

20 Claims, 7 Drawing Sheets

(56) References Cited

U.S. PATENT DOCUMENTS

| | | | | |
|---|---|---|---|---|
| 5,856,779 A * | 1/1999 | Friday | | B60Q 1/44 |
| | | | | 116/35 R |
| 5,886,628 A | 3/1999 | Alhassoon | | |
| 6,529,126 B1 * | 3/2003 | Henry | | A42B 3/0453 |
| | | | | 340/425.5 |
| 6,693,526 B1 | 2/2004 | Puccio | | |
| 6,710,709 B1 * | 3/2004 | Morin | | B60Q 1/44 |
| | | | | 340/463 |
| 6,933,839 B2 * | 8/2005 | Henry | | B60R 25/1004 |
| | | | | 340/425.5 |
| 7,342,487 B2 * | 3/2008 | Del Estal Villar | | B60Q 1/52 |
| | | | | 340/463 |
| 7,455,139 B2 * | 11/2008 | Lee | | B60Q 1/2673 |
| | | | | 180/167 |
| 7,482,756 B2 * | 1/2009 | Kesterson | | B60Q 1/2603 |
| | | | | 307/10.8 |
| 7,619,511 B2 * | 11/2009 | Kesterson | | B60Q 1/20 |
| | | | | 315/82 |
| 9,580,009 B1 * | 2/2017 | Lenker | | B60Q 1/2603 |
| 2004/0227646 A1 * | 11/2004 | Henry | | B60R 25/1004 |
| | | | | 340/902 |
| 2006/0232396 A1 * | 10/2006 | Oasem | | B60Q 1/444 |
| | | | | 340/479 |
| 2007/0242339 A1 * | 10/2007 | Bradley | | B60Q 1/0017 |
| | | | | 359/237 |
| 2007/0247298 A1 * | 10/2007 | Laukkanen | | B60Q 1/2657 |
| | | | | 340/479 |
| 2008/0130303 A1 * | 6/2008 | Medina | | B60Q 1/2603 |
| | | | | 362/475 |
| 2009/0045932 A1 * | 2/2009 | Petersen | | B60Q 1/448 |
| | | | | 340/467 |
| 2009/0051522 A1 * | 2/2009 | Perkins | | B60Q 1/2603 |
| | | | | 340/468 |
| 2009/0051523 A1 * | 2/2009 | Perkins | | B60Q 1/2603 |
| | | | | 340/478 |
| 2016/0193958 A1 * | 7/2016 | Smith | | B60Q 1/28 |
| | | | | 362/473 |
| 2017/0158118 A1 * | 6/2017 | Lenker | | B60Q 1/52 |

* cited by examiner

MOTORCYCLE TAILLIGHT WITH INTERMITTENT FLASHING SYSTEM AND METHOD THEREOF

BACKGROUND

A taillight on a motorcycle may indicate when brakes are being applied to alert a driver following the motorcycle. This alert may indicate to that driver to slow down or stop their vehicle. A front brake or rear brake may activate the taillight. The front brake may be applied through a hand lever while a rear brake may be applied through a foot lever. When the hand lever and/or foot lever is actuated, the taillight may be activated by being solidly lit when either or both of the levers are pressed.

Wiring systems for the taillight in most motorcycles is not overly complex. At one end of the motorcycle, the rear may have sockets. Bulbs in the sockets may connect to a wiring harness. At the other end of the motorcycle may be a brake switch. This switch may be actuated through the hand lever and/or foot lever. Actuation may occur when the foot lever is pressed down or hand lever is actuated such that it creates contact that completes a circuit. The system may then draw power from a power source on the motorcycle to activate the lights through the bulbs.

Despite the use of the taillight, motorcycles may be less visible than other larger vehicles, especially when stopped behind other traffic. The illumination of the taillight may be hard to recognize when the motorcycle is near other vehicles with bright or brighter taillights. Further, the transition of light brightness during braking may not be noticed if a following driver is not looking directly at the motorcycle as the brakes are applied. The present disclosure provides a system and method thereof that may provide an intermittent flashing taillight and in particular, taillights that may be easily discernable through flashing sequences when the foot lever is actuated and the hand lever is actuated between on and off. Other benefits and advantages will become clear from the disclosure provided herein and those advantages provided are for illustration.

BRIEF DESCRIPTION

According to one exemplary embodiment, a taillight assembly for a motorcycle is provided. The assembly may include a hand lever associated with a front brake of the motorcycle and a foot lever associated with a rear brake of the motorcycle. In addition, the assembly may include at least one light source on the motorcycle intermittently flashing according to actuations of the hand lever between on and off when the foot lever is continuously actuated, the intermittent flashes directly corresponding to the hand lever going between on and off.

According to another exemplary embodiment, a method for intermittently flashing at least one taillight on a motorcycle is provided. The method may include detecting actuations of a hand lever associated with a front brake of the motorcycle and detecting a continuous actuation of a foot lever associated with a rear brake of the motorcycle. In addition, the method may include intermittently flashing the at least one taillight on the motorcycle according to whether a predetermined number of actuations of the hand lever associated with the front brake of the motorcycle within a predetermined period occurs and when the foot lever associated with the rear brake of the motorcycle is continuously actuated.

According to yet another exemplary embodiment, a motorcycle is provided. The motorcycle may include a hand lever associated with a front brake of the motorcycle, a foot lever associated with a rear brake of the motorcycle, at least one taillight and a controller. The controller may intermittently flash the at least one taillight according to actuations between on and off of the hand lever associated with the front brake of the motorcycle when the foot lever associated with the rear brake of the motorcycle is continuously actuated.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, the systems and methods disclosed herein are directed to an intermittent flashing taillight on a motorcycle that may be activated when a foot lever is actuated and a hand lever is actuated between on and off. The flashing sequences, which may be controlled by the driver, through directly actuating the hand lever between on and off, may be more easily discernable than a solid illuminated taillight found in current motorcycles. In an illustrative embodiment, the motorcycle may include a hand lever that is associated with a front brake and a foot lever that is associated with a rear brake. At least one taillight may be provided in the motorcycle. A controller on the motorcycle may intermittently flash the at least one taillight according to actuations of the hand lever between on and off and when the second lever is continuously actuated.

Numerous other modifications or configurations to the system and method will become apparent from the description provided below. For example, a secondary taillight, in combination with the at least one taillight, may be provided such that it activates when either the hand lever or foot lever is actuated. In another example, either the driver, as shown above, or the motorcycle itself, through a variety of programs, may produce different flashing sequences. Other advantages will become apparent from the description provided below.

Figure 1:
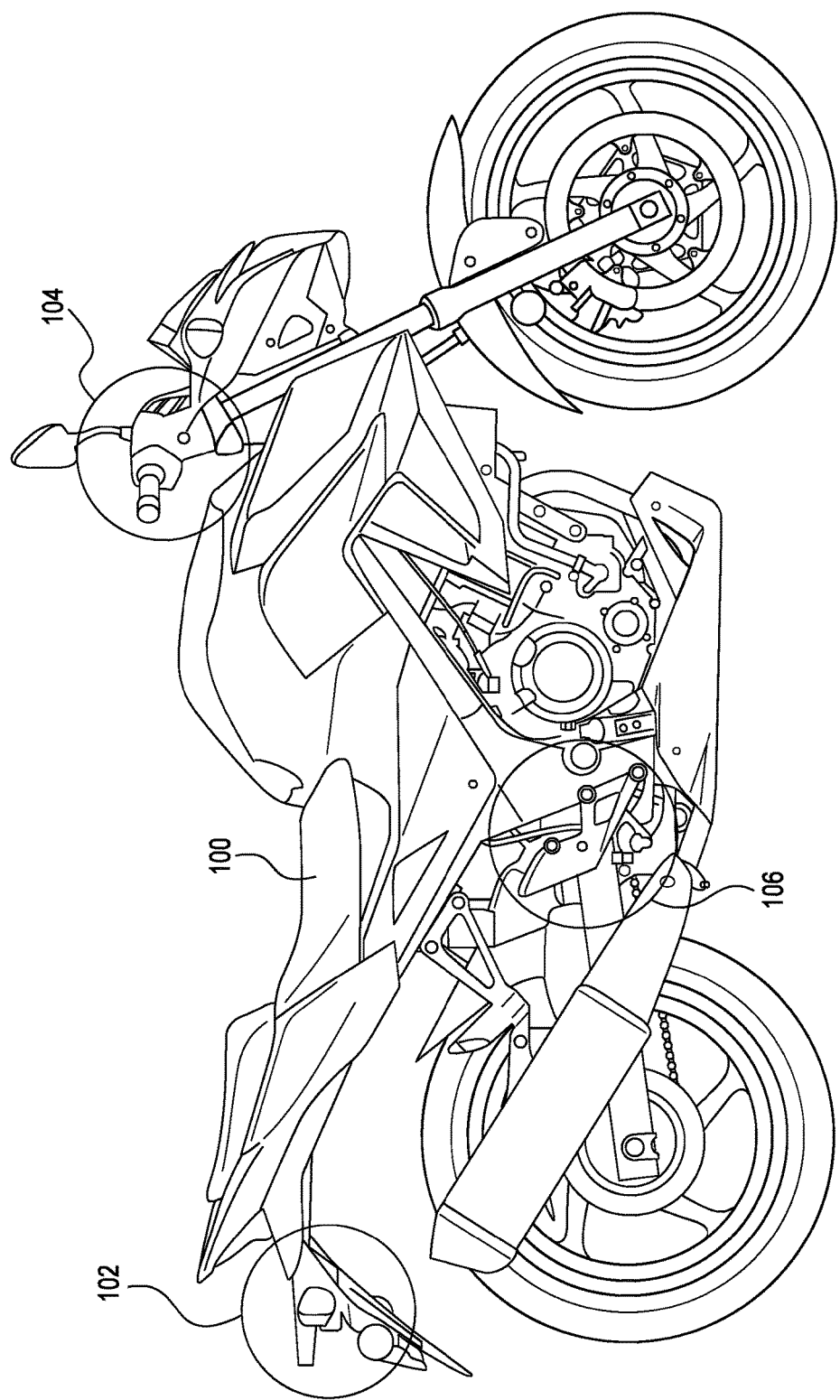
FIG. 1 is a schematic of an illustrative motorcycle showing an exemplary motorcycle taillight assembly with an intermittent flashing system in accordance with one aspect of the present disclosure.

Turning now to FIG. 1, a schematic of an illustrative motorcycle 100 showing an exemplary motorcycle taillight assembly 102 with an intermittent flashing system in accordance with one aspect of the present disclosure is provided. The motorcycle 100 may include, but is not limited to, a rear brake system 106 (to be shown in FIG. 2) and a front brake system 104 (to be shown in FIG. 3) to intermittently flash the taillight assembly 102 (to be shown in FIG. 4). Through the front brake system 104 and the rear brake system 106, the intermittent taillight assembly 102 may be easily discernable through flashing sequences when the foot lever of the rear brake system 106 is continuously actuated and the hand lever of the front brake system 104 is actuated between on and off. The flashing of the intermittent taillight assembly 102 may be directly proportional to the actuations of the hand lever.

For a typical motorcycle user, roughly seventy percent (70%) of braking effort goes through the front brake system 104. The front wheel, which may use a hand lever on a right grip of the motorcycle 100, may provide this seventy percent (70%) of the braking. The other thirty percent (30%) may be provided through the rear brake system 106, which may be operated by a right foot lever or pedal. The user may have more control of the front brake system 104 than the rear brake system 106. Thus, and taking advantage of the user's control of the front braking system 104, the flashing taillight assembly 102 may be primarily based on the hand lever.

Figure 2:
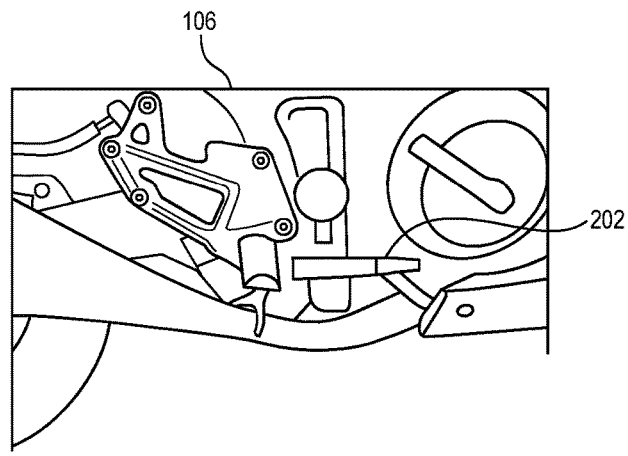
FIG. 2 is a schematic of an exemplary rear brake system having a rear brake foot lever within the illustrative motorcycle provided in FIG. 1 in accordance with one aspect of the present disclosure.

FIG. 2 is a schematic of an exemplary rear brake system 106 having a rear brake foot lever 202 within the illustrative motorcycle 100 provided in FIG. 1 in accordance with one aspect of the present disclosure. The rear brake system 106 may include, but is not limited to, a foot lever 202, or pedal, on the right side of the motorcycle 100 and positioned where a driver's leg may easily actuate it. Actuation of the foot lever 202 may continuously occur by pressing down or engaging the lever 202. When properly engaged, the foot lever 202 may lock into place. Typically, the foot lever 202 may be used before that foot of the driver props up the motorcycle 100 when completely stopped. When the driver wishes to disengage the foot lever 202, the user may press down on it again and unlock it.

Figure 3:
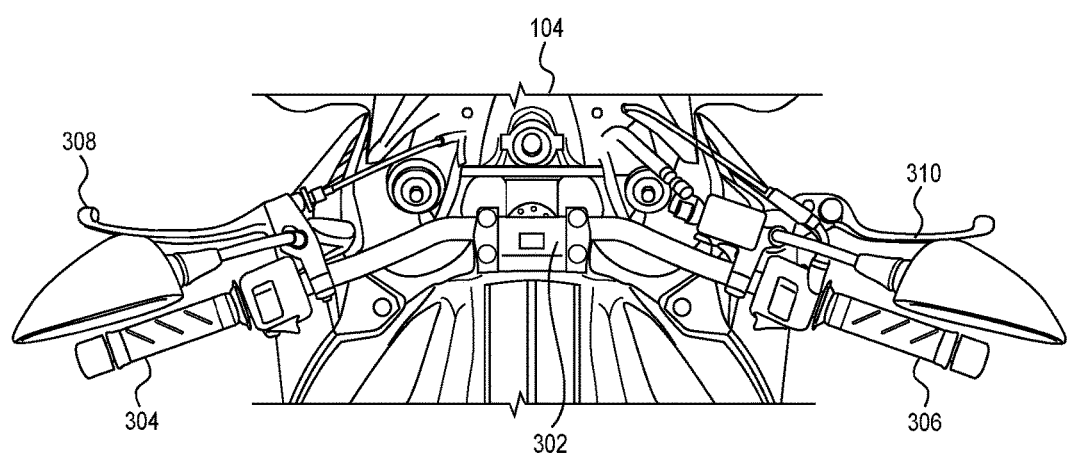
FIG. 3 is a schematic of an exemplary front brake hand lever within the illustrative motorcycle provided in FIG. 1 in accordance with one aspect of the present disclosure.

FIG. 3 is a schematic of an exemplary front brake hand lever 310 within the illustrative motorcycle 100 provided in FIG. 1 in accordance with one aspect of the present disclosure. The steering column 302 of the motorcycle 100 may include a left handle bar 304 and right handle bar 306 with a left hand lever 308 and right hand lever 310, the right hand lever associated with the front brake system 104. Fewer or more components may be provided within steering column 302 and are not necessarily limited to those shown.

The left hand lever 308 may be associated with a clutch. The clutch has been traditionally been placed with the left side of the steering column 302, however, this may vary from manufacturer to manufacturer. The lever 308 on the left handle bar 304 may act via a cable or hydraulic system to engage or disengage the clutch. The clutch may be engaged when the lever 308 is out. When the lever 308 is pulled toward the driver, the motorcycle clutch is actuated through either a cable that goes to the physical clutch release mechanism or hydraulically operated. Use of a hydraulic clutch may eliminate broken clutch cables and make using the clutch easier.

The right hand lever 310 on the steering column 302 may be used to activate the front braking system 106. Braking has been traditionally associated with the right hand lever 310 on the right handle bar 306, however, this may vary from one manufacturer to another. In one embodiment, the motorcycle 100 may have a linked braking system where actuating the hand lever 310 between on and off may activate a portion of the front braking and also activate a portion of the rear brake.

The hand lever 310 may be actuated when the lever 310 is pulled towards the handle bar 306. Pumping the hand lever 310 may be the action of bringing the lever 310 back and forth towards the handle bar 306 repeatedly. This may actuate the hand lever 310 between on and off "Off" may indicate that the hand lever 310 is furthest away from the driver. Typically, the hand lever 310 may go back to the "Off" position in a relaxed state, i.e., not squeezed. The "On" position may be such that the hand lever 310 is pressed inwards and close to the driver, i.e., squeezed towards the handle bar 306.

Figure 4:
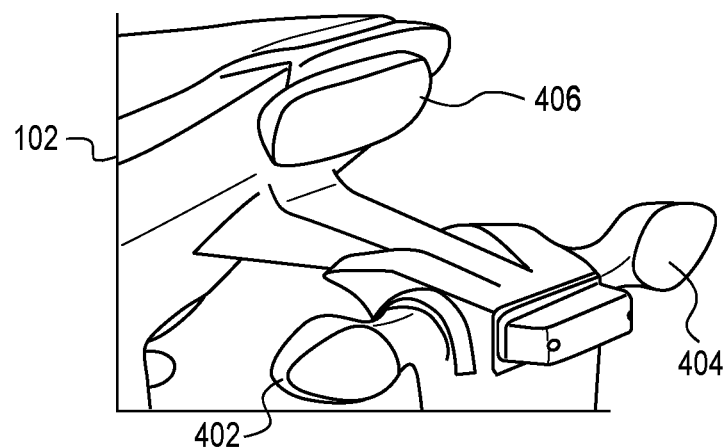
FIG. 4 is a schematic of the exemplary taillight assembly within the illustrative motorcycle provided in FIG. 1 in accordance with one aspect of the present disclosure.

FIG. 4 is a schematic of the exemplary taillight assembly 102 within the illustrative motorcycle 100 provided in FIG. 1 in accordance with one aspect of the present disclosure. The taillight assembly 102 may include a first set of taillights 402 and 404 and a second taillight 406. The first set of taillights 402 and 404 may be positioned below the second taillight 404. The taillights 402, 404 and/or 406 of the taillight assembly 102 may be made of incandescent lamps, light emitting diodes, high intensity discharge lamps, and neon tubes. The shown configuration is one example and should not be construed as limiting to the present disclosure.

In one embodiment, the first set of taillights 402 and 404 may provide the intermittent flashing. The taillights 402 and 404 may be separated between a center portion of the taillight assembly 102. Different shapes, colors and sizes of the taillights 402, 404 and 406 may be used. Activation of the first set of taillights 402 and 404 may occur when the foot lever 202 is actuated, thereby also activating the rear brake system 106, and the hand lever 310 is actuated between on and off such that it creates contact that completes a circuit. Actuating the hand lever 310 between on and off may also activate the front brake system 104 between on and off. The system may then draw power from a power source on the motorcycle 100 to activate the first set of taillights 402 and 404. This activation may directly correspond to the pumping of the hand lever 310.

Different forms of logic for activating the taillights 402, 404 and/or 406 may be used and are not limited to the sequences corresponding to the actuations of the hand lever 310 when the foot pedal 202 is continuously actuated. In one embodiment, and as will be shown below, a logic box may be used to provide different sequences, for example, a more regular flashing may be provided when the hand lever 310 is continuously held down. Different pumping may also lead to different flashings. For example, and in accordance with one embodiment, the driver may actuate the hand lever 310 between on and off several times before the intermittent flashing may begin. The intermittent flashing may not begin until several actuations between on and off of the lever 310 are recognized by the logic box.

In another example, actuating the lever 310 between on and off with different sequences may activate quicker flashes. This example may not be dependent on the direct correspondence between the pumping of the lever 310. Quicker flashes of the first set of taillights 402 and 404 may occur if the driver actuates the lever 310 between on and off a predetermined amount of times within a period of time, for example, five (5) actuations between on and off of the lever 310 within a second would speed up the flashing. Oppositely, slower flashes may be provided when the driver actuates the lever 310 between on and off two (2) times within a second. In this example, the logic box may include a program which may be executed by the motorcycle 100 to speed up or slow down the flashing based on the actuations of the hand lever 310.

The second taillight 406 of the taillight assembly 102 may also be controlled through actuations of the hand lever 310 and/or the foot lever 202. The activation of the second taillight 406 may be performed when either the hand lever 310 or the foot lever 202 is actuated. That is, either of them may control the taillight 406. This may be performed through the logic box and/or circuit shown below, which may be similar to that for the activation of the first set of taillights 402 and 404.

In one embodiment, flashing sequences from the first set of taillights 402 and 404 and the second tail light 406 may be provided. The first set of taillights 402 and 404 may be activated, or flashed, while the second taillight 406 is not. When the first set of taillights 402 and 404 are not activated, or flashed, the second taillight 406 may be activated, or flashed. This sequence may allow for more awareness of the motorcycle 100 when it has stopped. The alternating flashes of the first set of taillights 402 and 404 and the second tail light 406 may be controlled by the logic box, or may be implemented in a circuit.

Figure 5:
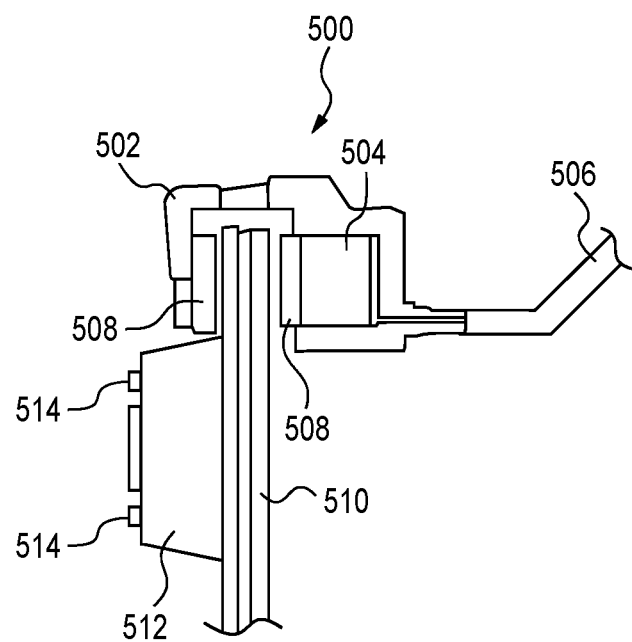
FIG. 5 is a schematic of an exemplary brake system in accordance with one aspect of the present disclosure.

FIG. 5 is a schematic of an exemplary brake system 500 in accordance with one aspect of the present disclosure. The brake system 500 may be part of the front brake system 104 and/or rear brake system 106. When activated by the foot lever 202 and/or hand lever 310 mechanical force may be converted into hydraulic pressure. The foot lever 202 and/or hand lever 310 may actuate a piston 504 when pushed by fluid within a brake line 506 to activate the brakes. The brake system 500 may include, but is not limited to, a caliper 502, piston 504, brake line 506, brake pads 508, rotor 510, hub 512 and bolts 514 for attaching a tire. Those components provided within the brake system 500 are for illustrative purpose and should not be construed as limiting to the present disclosure.

In one exemplary use of the brake system 500, the force with which the driver actuates the foot lever 202 and/or hand lever 310 may determine the amount of pressure imparted into the system 500. The brake line 506 may transmit pressure from a master cylinder to the caliper 502. The caliper 502 may apply a multiplying power for the hydraulics. Since pressure applied to a confined liquid may be transmitted undiminished and with equal force to the surfaces within the system 500, the pressure from the master cylinder may be exerted uniformly on the much larger area of the caliper 502, increasing the force many times.

The caliper 502 may then push the brake pads 508 against the rotor 510 to stop the motorcycle 100. Rotors 510 may be typically made from stainless steel and lined with cast iron. Both materials may be a durable, heat-resistant surface for the brake pads 508 to press against. The rotors 510 may be relieved and/or drilled to assist in cooling and to help shed water and debris.

The hub 512 of the brake system 500 may be coupled to the rotor 510 and may hold the wheel parts together. The hub 512 may secure the wheels to the motorcycle 100 to ensure that they stay in place. The hub 512 may include wheel bearings, which allow the wheels to turn. On the hub 512 may be a number of bolts 514 that may be used to anchor a tire into.

Figure 6:
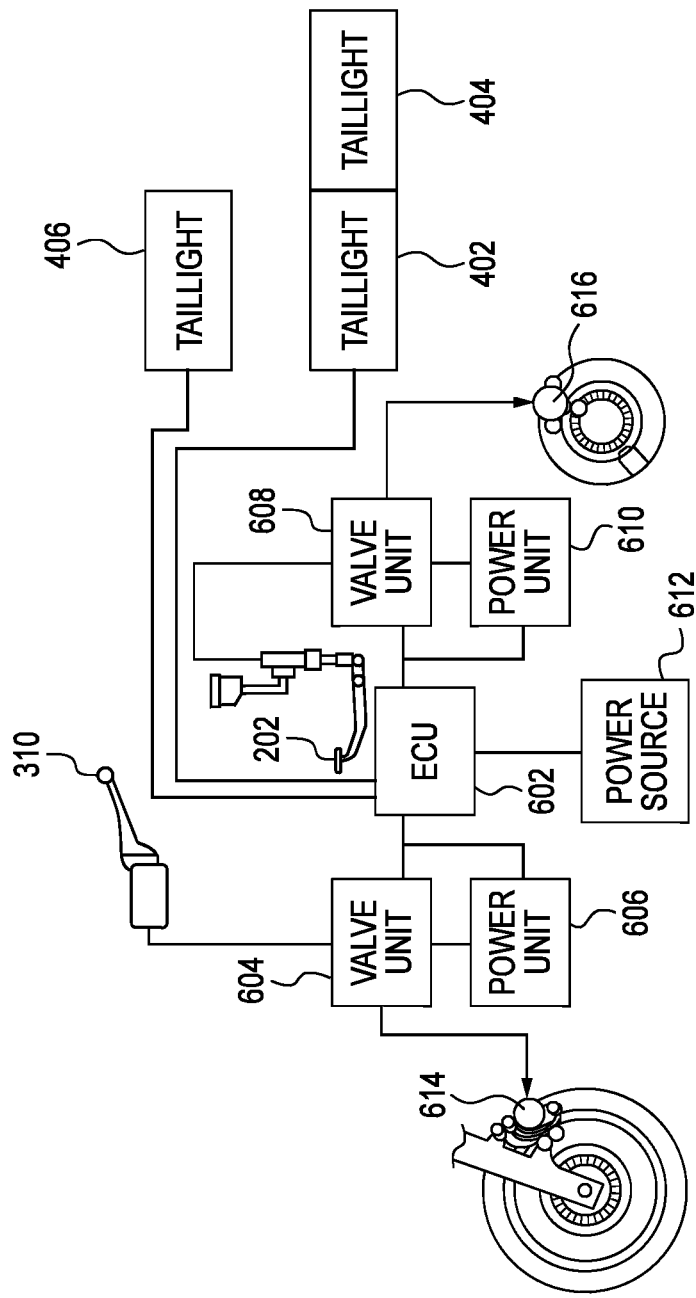
FIG. 6 is a schematic of the exemplary motorcycle taillight with intermittent flashing system in accordance with one aspect of the present disclosure.

Turning to FIG. 6, a schematic of the exemplary motorcycle 100 with intermittent flashing system in accordance with one aspect of the present disclosure is provided. The motorcycle 100 may include the hand lever 310 for the front brake 614 and the foot lever 202 for the rear brake 616. The brakes 614 and 616 may be the same or similar to the brake system 500 described above. The shown components should not be construed as limiting, but be used for illustrative purposes.

The front hand lever 310, which controls the front brake 614, may be connected to a front valve unit 604 and front power unit 606. The front valve unit 604 may determine the amount of brake 614 that may be applied. The front power unit 606 may use hydraulics to slow down or stop the motorcycle 100. The unit 606 may use a combination of mechanical components to multiply the force applied to the front hand lever 310 by the driver into enough force to activate the brake 614.

The foot lever 202, which controls the rear brake 616, may be coupled to the rear valve unit 608 and the rear power unit 610. The rear valve unit 608 may determine the amount of brake 616 that may be applied. The rear power unit 610 may use hydraulics to slow down or stop the motorcycle 100. The unit 610 may use a combination of mechanical components to multiply the force applied to the foot lever 202 by the driver into enough force to activate the brake 616. Typically, the foot lever 202 locks the rear brake 616 in a single click through action whereby the user may then hold up the motorcycle 100 with that particular leg.

An electronic control unit (ECU) 602, or controller, may be coupled to the front valve unit 604, front power unit 606, rear valve unit 608 and the rear power unit 610. More than one ECU may be provided within the motorcycle 100. The ECU 602 may control and monitor operations of the motorcycle 100 including providing the flashing of the taillights 402, 404 and/or 406. The ECU 602 may include a programmed data processor and memory for storing computer programs and data. The data processor may execute routines stored in the memory. The ECU 602 may include a logic box and/or circuit which will be described in more details below.

To control the flashing of the taillights 402, 404 and/or 406, the ECU 602 may receive inputs from the foot lever 202 and/or hand lever 310.

In one embodiment, the ECU 602 may include the functionality or features for flashing, rather than having the flashing be based on direct actuations between on and off of the hand lever 310. The ECU 602 may include programs or instructions for execution by the processor. Inputs may be taken in through the hand lever 310 and/or the foot lever 202. The ECU 602 may be a simple circuit or may contain much more logic that may provide different sequences, which will be provided below.

A power source 612 may also be provided in the motorcycle 100. The power source 612 may be in the form of a battery. Flashing of the taillights 402, 404 and/or 406 may be performed by connecting the power source 612 with the taillights 402, 404 and/or 406. This connection may be performed by gates, switches or through the ECU 602.

Figure 7:
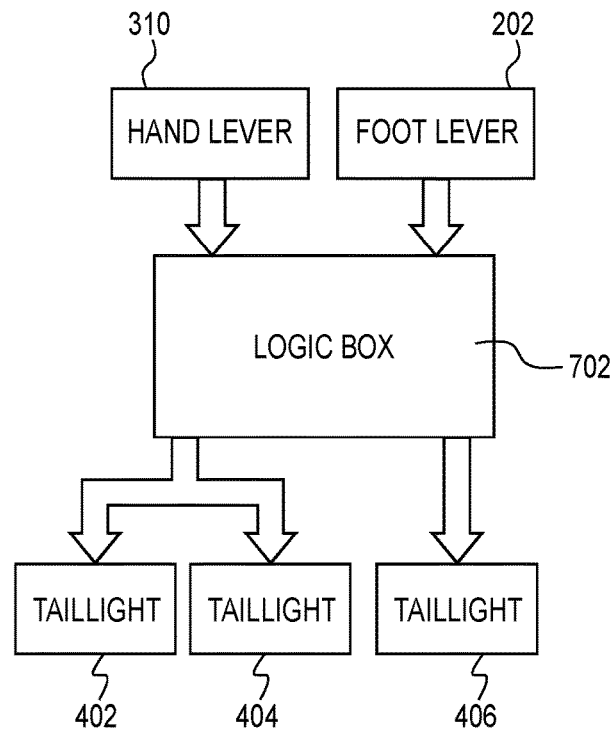
FIG. 7 is a schematic of an illustrative logic box for the exemplary motorcycle taillight system with intermittent flashing in accordance with one aspect of the present disclosure.

FIG. 7 is a schematic of an illustrative logic box 702 for the exemplary motorcycle taillight system 102 with intermittent flashing in accordance with one aspect of the present disclosure. The logic box 702 may be within or a part of the ECU 602 or another component within the motorcycle 100. As shown, the logic box 702 may receive different inputs from the foot lever 202 and/or the hand lever 310. Actuation determinations from the foot lever 202 may provide these inputs and may be provided when the driver of the motorcycle 100 presses the lever 202 downwards while determinations from the hand lever 310 may be made when the lever 310 is pumped. The inputs may be provided in the form of "yes" or "no" or "on" or "off" or "1" or "0".

The logic box 702, taking the input from the foot lever 202 and/or the hand lever 310, may provide output, in the form of flashing, to the taillights 402, 404 and/or 406. This may be provided as "yes" or "no" or "on" or "off" or "1" or "0" to each of the taillights 402, 404 and/or 406. In one embodiment, the taillights 402 and 404 may be tied to the same output from the logic box 702 such that they may flash at the same time, i.e., together. The other taillight 406 may be flashed independently from the set of taillights 402 and 404. The logic box 702 may include a simple circuit or much more complex circuit to provide output to the taillights 402, 404 and/or 406. A programmable logic array may also be used to provide the functions and features of the logic box 702.

Through the logic box 702, the taillights 402, 404 and/or 406 may be flashed, or activated, based on input from the foot lever 202 and/or the hand lever 310. In one embodiment, the set of taillights 402 and 404 may be intermittently flashed when the foot lever 202 is constantly actuated and the hand lever 310 is intermittently actuated between on and off. The flashing sequence of the taillights 402 and 404 may directly correspond to those actuations made on the hand lever 310. That is, if the driver of the motorcycle 100 presses the hand lever 310 every other second, then the taillights 402 and 404 may be flashed every other second. In another example, if the driver actuates the lever 310 every three (3) seconds for a short burst, then the taillights 402 and 404 may be flashed every three (3) seconds with the short burst. The duration for flashing the taillights 402 and 404 may be based on the duration of the hand lever 310 actuation. Each of the scenarios presented above may be performed when the driver of the motorcycle 100 has continuously actuated the foot lever 202.

In one embodiment, the logic box 702 may provide a delay for detecting whether the driver wants to flash the taillights 402 and 404. In this delay, the logic box 702 may determine whether the driver has actuated the hand lever 310 between on and off a predetermined number of times before allowing the driver to control the flashing of the taillights 402 and 404 through the hand lever 310. A pump detection circuit within the logic box 702 may be used. This circuit may be activated when the foot lever 202 is actuated continuously. When the driver actuates the hand lever 310 between on and off, the circuit may determine whether the driver wants to implement the intermittent flashing. This may be determined if the driver actuates the hand lever 310 between on and off a predetermined number of times within a period of time. For example, if the driver actuates the hand lever 310 between on and off two (2) times within a span of a second, the logic box 702 and/or the pump detection circuit may determine that the driver intends to intermittently flash the taillights 402 and 404 directly through the hand lever 310. After the delayed period of time for detecting the activation of the intermittent flashing by the pump detection circuit, the motorcycle 100 may then flash the taillights 402 and 404 corresponding to actuations of the hand lever 310. The intermittent flashing may stop after the driver release their foot from the foot lever 202.

The other taillight 406 may be activated when either the foot lever 202 or hand lever 310 has been actuated. This may be performed through the logic box 702 or a simple circuit. In one embodiment, the flashing of the other taillight 406 may be performed opposite to that of the set of taillights 402 and 404. That is, when the set of taillights 402 and 404 are activated, then the other taillight 406 may not be activated. Otherwise, when the set of taillights 402 and 404 are not activated, the other taillight 406 is activated.

In one embodiment, instead of allowing the actuations of the hand lever 310 to determine the flashing sequence, the logic box 702 may provide for a more steady sequence of flashing. In one embodiment, the steady sequences of flashing may be activated when the foot lever 202 is continuously actuated and the hand lever 310 is actuated between on and off for a predetermined number of times within a period. Once the hand lever 310 is actuated between on and off enough times within the period, the sequential flashing of the taillights 402 and 404 may occur.

Continuing, the driver of the motorcycle 100 may speed up the sequence that the taillights 402 and 404 are flashing by actuating the hand lever 310 between on and off at a faster pace. The flashing may decrease when the hand lever 310 is actuated between on and off at a slower pace. For example, the driver may actuate the hand lever 310 one (1) time per second or two (2) times per second. Through the increasing or decreasing of the actuations of the hand lever 310, the logic box 702 may speed up or slow down the flashing. In one embodiment, this may be activated when the foot lever 202 is continuously actuated. When the foot lever 202 is not actuated, then the flashing of the taillights 402 and 404 may stop.

In one embodiment, the set of taillights 402 and 404 may not be tied together such that they may flash at different times. Different patterns may be provided through the three taillights 402, 404 and 406 on the motorcycle 100. The triangular formation of the taillights 402, 404 and 406 may allow them to create patterns. The pattern may include the look of movement from one taillight 402, 404 or 406 to another. The first taillight 402 may flash, while the other taillights 404 and 406 are not on. The second taillight 404 may be flashed and the other taillights 402 and 406 are off. Then the third taillight 406 may be flashed while the other two taillights 402 and 404 are off. By repeating this sequence, a pattern may be produced on the taillights 402, 404 and 406. This pattern may be more recognizable by following drivers.

In one embodiment, the taillights 402 and 404 may flash, while taillight 406 does not. When taillight 406 flashes, the other taillights 402 and 404 may flash. While a number of different functions and features may be provided by the logic box 702, those shown above should not be construed as limiting to the present disclosure. Variations including additions and subtractions of those features shown above have been contemplated and are within this disclosure. Typically, these features may be activated when the foot lever 202 has been actuated, thus control may be provided by the hand lever 310.

Figure 8:
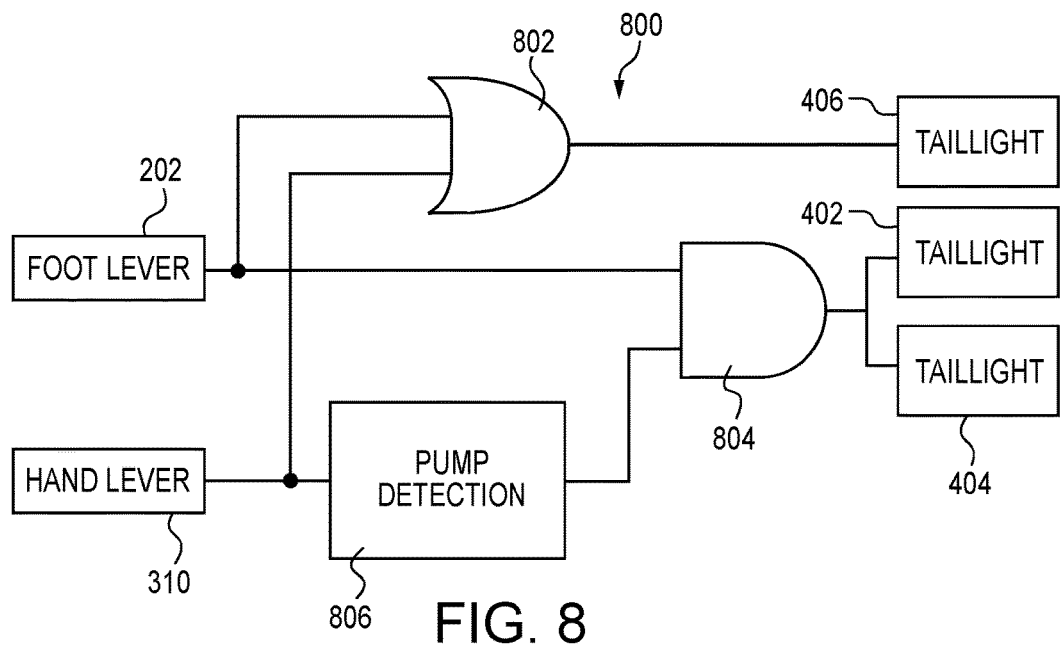
FIG. 8 is a schematic of an illustrative logic gate system for the exemplary motorcycle taillight system with intermittent flashing in accordance with one aspect of the present disclosure.

FIG. 8 is a schematic of an illustrative logic gate system 800 for the exemplary motorcycle taillight system 102 with intermittent flashing in accordance with one aspect of the present disclosure. The system 800 provides a number of different logic gates that may be used to provide the desired output in the form of flashing, or turning on, the taillights 402, 404 and 406. Fewer or more components, including gates, may be used within the system 800 for providing the desired functionality and features as described above with the logic box 702.

For purpose of illustration, the system 800 may include an OR gate 802, AND gate 804 and a pump detection circuit 806. The logic gates 802 and 804 may be made up of diodes or transistors. Using amplification, these components may be made up in a way that allows for creation of these types of gates 802 and 804. The pump detection circuit 806 may be made of logic gates including flip-flops, buffers, inverters, etc. Put together, an event may be captured by the pump detection circuit 806 that is used to determine whether the driver of the motorcycle 100 intends to activate the flashing.

The logic gate system 800, in sum, may provide for intermittent activation of the set of taillights 402 and 404 when the hand lever 310 is actuated between "On" and "Off" and the foot lever 202 is continuously actuated. As shown above, this is one example and should not be construed as limiting. The foot lever 202, associated with the rear brake 616, and the hand lever 310, associated with the front brake 614, may provide input into the system 800. When the foot lever 202 and/or the hand lever 310 are actuated, a logical "1" may be provided otherwise a logical "0" may be provided into the system 800. The front brake 614 and/or the rear brake 616 may be activated depending on which lever 202 and/or 310 is actuated.

The logical input of the foot lever 202 and the hand lever 310 may be provided into the OR gate 802. Output of the OR gate 802 may then be sent to the second taillight 406. By using the OR gate 802, either the foot lever 202 or the hand lever 310 may activate the taillight 406. That is, if the driver of the motorcycle 100 actuates either brakes 614 and 616, the second taillight 406 may be activated.

In addition, the input from the foot lever 202 and the hand lever 310 may be provided to the AND gate 804. The output of the AND gate 804 may then be provided to the set of taillights 402 and 404 used for intermittently flashing them. Logically, the AND gate 804 may be activated when the foot lever 202 is continuously actuated and the hand lever 310 is actuated between "On" and "Off". Thus, the pumping of the hand lever 310 creates logical "1"s and "0"s to flash the taillights 402 and 404 "On" and "Off" when the foot lever 202 is constantly held at a logical "1". This may then create the flashing of the taillights 402 and 404 through the AND gate 804.

Further logic may be provided within the logic gate system 800. For example, and as shown, the pump detection circuit 806 may be used. The pump detection circuit 806 may detect when a driver of the motorcycle 800 wishes to enable the intermittent flashing by the pumping of the hand lever 310. A flip-flop gate may be used to capture the pumping sequence by the driver. If the pumping sequence is detected, then after a period of delay used to determine whether the driver wants to enact the intermittent flashing, control may be given to the hand lever 310 such that the intermittent flashing may be begin by the pumping sequences given at the AND gate 804.

To further elaborate the exemplary system 800, when the foot lever 202 is "0" and the hand lever 310 is "0", the output of the OR gate 802 is "0". The "0" output of the OR gate 802 may then be fed to the second taillight 406. In addition, and when the foot lever 202 is "0" and the hand lever 310 is "0", the AND gate 804 may provide output of "0" to the taillights 402 and 404.

When the foot lever 202 is "0" and the hand lever 310 is "1", the output of the OR gate 802 may be "1". Thus, the second taillight 406 may be turned "On". For the first set of taillights 402 and 404, input for the foot lever 202 and hand lever 310 are provided to the AND gate 804. When the foot lever 202 is "0" and hand lever 310 is "1", then the output to the first set of taillights 402 and 404 may be "0".

Continuing, when the foot lever 202 is "1" and the hand lever 310 is "0", the output of the OR gate 802 may be "1". Thus, the second taillight 406 may be turned "On". For the first set of taillights 402 and 404, input for the foot lever 202 and hand lever 310 are provided to the AND gate 804. When the foot lever 202 is "1" and hand lever 310 is "0", then the output to the first set of taillights 402 and 404 may be "0".

The user may pump the hand lever 310 between "1"s and "0"s when the foot lever 202 is "1" to flash the taillights 402 and 404. When the foot lever 202 is "1" and the hand lever 310 is "1", the output of the OR gate 802 may be "1". The second taillight 406 may be turned "On". For the first set of taillights 402 and 404, input for the foot lever 202 and hand lever 310 are provided to the AND gate 804. When the foot lever 202 is "1" and hand lever 310 is "1", then the output to the first set of taillights 402 and 404 may be "1". Thus, and as shown above, when the hand lever 310 is pumped, the taillights 402 and 404 may be flashed according to actuations of the hand lever 310.

Moreover, and by pumping the hand lever 310, the input from the hand lever 310 leading to the AND gate 804 may be a series of "1"s and "0" s. The pump detection circuit 806 may delay the flashing of the taillights 402 and 404 through a number of flip-flops such that the pump detection circuit 806 may determine whether the user wishes to flash them. When the pump detection circuit 806 recognizes that the user intends to flash the taillights 402 and 404, there may be a delay in the output of turning the taillights 402 and 404 "On" and "Off". Typically, when the foot lever 202 is released, the taillights 402 and 404 may be turned "Off" regardless of the delay of the pump detection circuit 806, i.e., a sequence of "1"s and "0"s may still be within the pump detection circuit 806 when the taillights are shut "off" because of the foot lever 202 input going to "0".

In addition to those components provided in the logic gate system 800, a number of inverter gates, buffers, diodes, etc. may be used for timing the output of the OR gate 802, AND gate 804 and pump detection circuit 806 such that no timing delays are introduced. In one embodiment, a clocking signal may be provided such that it removes timing errors. The clocking signal may be used such that the gates 802 and 804 and pump detection circuit 806 may capture states on transitions between high to low states or low to high states of a clock cycle. Through this, the taillights 402, 404 and 406 may be flashed more uniformly.

Figure 9:
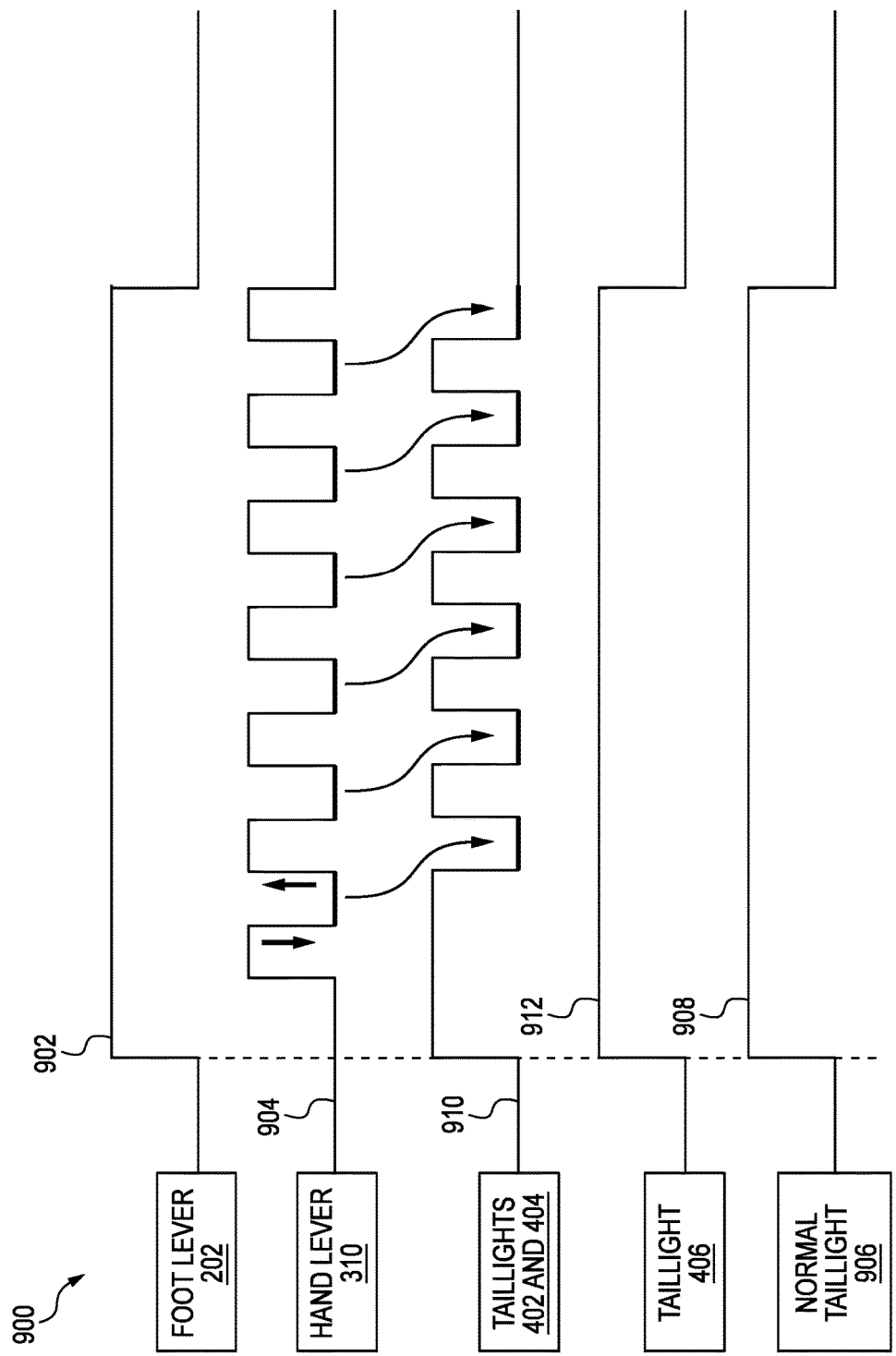
FIG. 9 is a schematic of an illustrative timing diagram for the exemplary motorcycle taillight system with intermittent flashing in accordance with one aspect of the present disclosure.

FIG. 9 is a schematic of an illustrative timing diagram 900 for the exemplary motorcycle taillight system 102 with intermittent flashing in accordance with one aspect of the present disclosure. The diagram 900 provides for logical "1"s and "0"s and these may be construed as "On" or "Off". It should be noted that the timings of each of these is for purposes of illustration and should not be construed as limiting.

The inputs from the foot lever 202 and the hand lever 310 are shown in the top portions of the diagram 900. The driver of the motorcycle 100, to enable the intermittent flashing, may continuously press on the foot lever 202. As shown, this provides the foot lever input line 902 as logical "1"s. The hand lever 310 may be actuated between on and off to enable the intermittent flashing. The hand lever input line 904 includes a number of alternating logical "1"s and "0"s. This indicates that the driver is pumping the hand lever 310.

In typical motorcycles 100, the normal taillight 906 would have a normal taillight line 908 of logical "1"s as either of the foot lever 202 and/or the hand lever 310 would cause it to be activated. The diagram 900 shows that at each point, the normal taillight 906 would be "1" since the foot lever input line 902 is actuated. When both of the foot lever 202 and the hand lever 310 are not actuated, then the normal taillight line 908 goes to "0" and no taillight 402, 404 or 406 is shown.

However, and in accordance with the motorcycle taillight system 102 provided herein, the intermittent taillights 402 and 404 may be flashed according to the pumping of the hand lever 310. The set of taillights 402 and 404 may be flashed according to the hand lever input line 904 as shown in a first set of taillights flashing line 910. In the shown embodiment, there is a time delay caused by the pump detection circuit 806. The pump detection circuit 806 may wait for a delayed amount of time to detect that the driver indeed wants to provide intermittent flashing. In this case, the delay is one cycle. The cycle may be part of an actuation of the hand lever 310 or the clock signal. After detection by the pump detection circuit 806, the flashing line 910 may correspond to pumps by the hand lever 310 as indicated.

When the foot lever 202 is released, then the flashing line 910 may go to "0" and the set of taillights 402 and 404 is not activated. In one embodiment, this may restart the timing of the flashing line 910 and may use another delay period to determine whether pumping is occurring by the pump detection circuit 806. Alternatively, when the hand lever 310 is at a logical "0" the set of taillights 402 and 404 is not activated, however, the flashing line 910 may still flash depending on the user pumping the hand lever 310 and continuous actuation of the foot lever 202.

The activation for the other taillight 406 may be based on either the foot lever 202 and/or the hand lever 310 being actuated. As shown, the taillight output line 912 is based on either of the inputs being "1". If both of the inputs fall to "0" then the output line 912 is dropped to "0" as well. Logically, this indicates that if either of the brakes 614 or 616 is "On", then the taillight 406 may also be on. However, if both brakes 614 and 616 are "Off", then the taillight 406 may be off.

Figure 10:
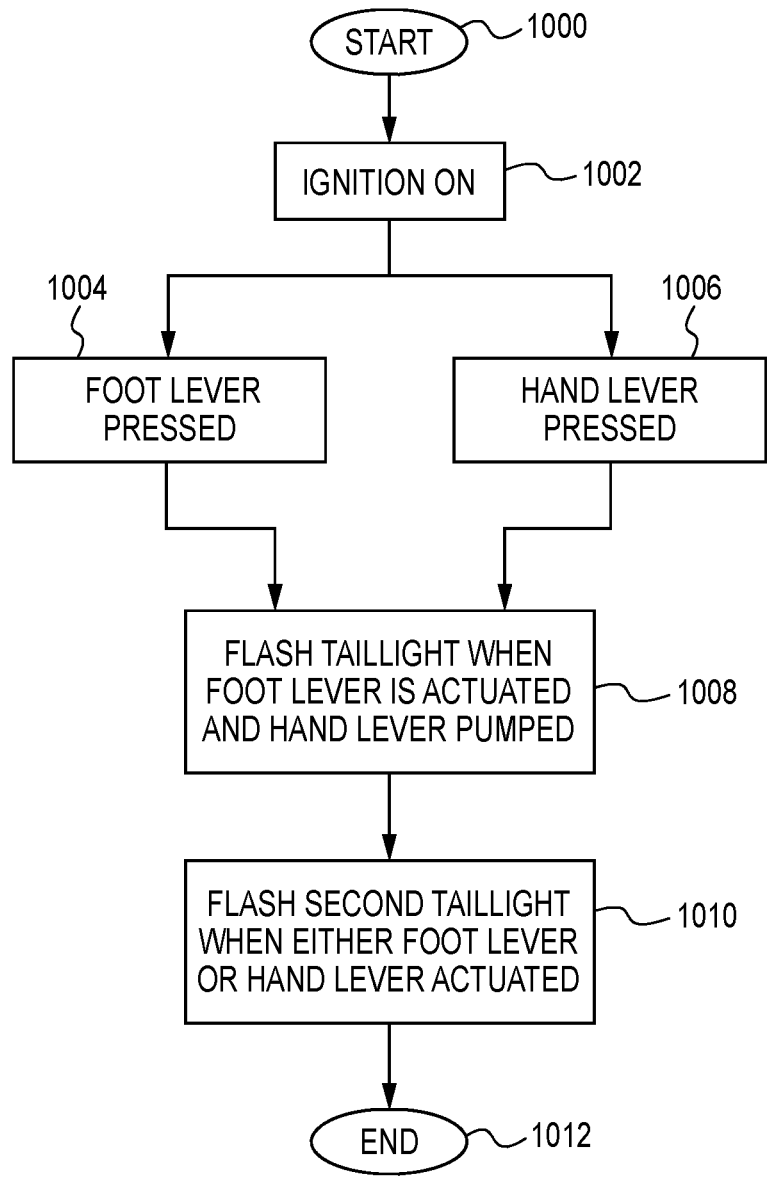
FIG. 10 is a schematic of an illustrative process flow diagram for providing the flashing system in accordance with one aspect of the present disclosure.

FIG. 10 is a schematic of an illustrative process flow diagram for providing the flashing system in accordance with one aspect of the present disclosure. Fewer or more processes may be used that were described above. The intermittent flashing processes may begin at block 1000. At block 1002, the ECU 610 may determine whether the ignition for the motorcycle 100 is on. This may be performed in a number of ways including determining whether a key is within the ignition of the motorcycle 100.

At block 1004, a determination of whether the foot lever 202 has been actuated, or pressed, is made. This may be determined when the driver pushes down on the lever 202 on their motorcycle 100. The input from this may be logical "1"s and "0"s, as described above. At the same or similar time, at block 1006, a determination of whether the hand lever 310 has been actuated, or pressed, is made. This may be performed when the driver pulls the lever 310 towards themselves against the right handle bar 306. The input from the hand lever 310 may be logical "1"s and "0"s.

At block 1008, the ECU 610 may flash the taillights 402 and 404 when the foot lever 202 is actuated and the hand lever 310 is pumped. In one embodiment, the foot lever 202 may be continuously actuated before the flashing of the taillights 402 and 404 begin. The pump detection circuit 806 may be used to determine whether the driver intends to use the intermittent flashing taillights 402 and 404.

At block 1010, the ECU 610 may flash the second taillight 406 when either the foot lever 202 or hand lever 310 is actuated. This taillight 406 may be kept on when the motorcycle 100 has stopped. The processes may continue until the foot lever 202 is raised, i.e., not actuated. The processes may begin anew when the foot lever 202 is depressed. The processes may end at block 1012.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A taillight assembly for a motorcycle comprising:
   a hand lever associated with a front brake of the motorcycle;
   a foot lever associated with a rear brake of the motorcycle; and
   at least one light source on the motorcycle intermittently flashing according to actuations of the hand lever between on and off when the foot lever is continuously actuated, the intermittent flashes directly corresponding to the hand lever going between on and off.

2. The taillight assembly of claim 1, wherein the hand lever is associated with a right handle bar of the motorcycle.

3. The taillight assembly of claim 1, wherein the foot lever is on a right side of the motorcycle.

4. The taillight assembly of claim 1, wherein the at least one light source comprises at least two light sources placed on a rear portion of the motorcycle.

5. The taillight assembly of claim 1, wherein the at least one light source on the motorcycle intermittently flashing is delayed by a predetermined cycle after the actuation of the hand lever between on and off and when the foot lever is continuously actuated.

6. The taillight assembly of claim 5, wherein the at least one light source on the motorcycle is intermittently flashed when the hand lever is actuated a predetermined number of times within the predetermined cycle.

7. The taillight assembly of claim 1, comprising another light source that is activated when the hand lever, foot lever or both are actuated.

8. A method for intermittently flashing at least one taillight on a motorcycle comprising:
    detecting actuations of a hand lever associated with a front brake of the motorcycle;
    detecting a continuous actuation of a foot lever associated with a rear brake of the motorcycle; and
    intermittently flashing the at least one taillight on the motorcycle according to whether a predetermined number of actuations of the hand lever associated with the front brake of the motorcycle within a predetermined period occurs and when the foot lever associated with the rear brake of the motorcycle is continuously actuated.

9. The method for intermittently flashing the at least one taillight of claim 8, wherein the intermittent flashing corresponds to the hand lever going between on and off.

10. The method for intermittently flashing the at least one taillight of claim 8, comprises applying a rear brake on the motorcycle when actuation of the foot lever is detected.

11. The method for intermittently flashing the at least one taillight of claim 8, comprises applying a front brake on the motorcycle when the actuation of the hand lever is detected.

12. The method for intermittently flashing the at least one taillight of claim 8, wherein the predetermined time period is one cycle.

13. The method for intermittently flashing the at least one taillight of claim 8, comprises activating another light source when the hand lever, foot lever or both are actuated.

14. A motorcycle comprising:
    a hand lever associated with a front brake of the motorcycle;
    a foot lever associated with a rear brake of the motorcycle;
    at least one taillight; and
    a controller intermittently flashing the at least one taillight according to actuations between on and off of the hand lever associated with the front brake of the motorcycle when the foot lever associated with the rear brake of the motorcycle is continuously actuated.

15. The motorcycle of claim 14, wherein the actuation of the hand lever activates the front brake of the motorcycle.

16. The motorcycle of claim 14, wherein the actuation of the foot lever activates the rear brake of the motorcycle.

17. The motorcycle of claim 14, comprising a second taillight activated by the controller when the hand lever, foot lever or both are actuated.

18. The motorcycle of claim 14, wherein the controller comprises:
    an OR gate receiving input from the hand lever and foot lever, wherein output of the OR gate provides activation of the second taillight; and
    an AND gate receiving the output from the OR gate and input from the hand lever, wherein the output of the AND gate provides activation of the at least one taillight.

19. The motorcycle of claim 18, comprising at least one delay circuit connected to the input from the hand lever before the AND gate.

20. The motorcycle of claim 14, wherein the controller intermittently flashing the at least one taillight comprises delaying the flashing by a cycle.

* * * * *